(12) United States Patent
Duan et al.

(10) Patent No.: US 8,577,153 B2
(45) Date of Patent: Nov. 5, 2013

(54) METHOD AND SYSTEM FOR SAMPLE IMAGE INDEX CREATION AND IMAGE FILTERING AND SEARCH

(75) Inventors: Manni Duan, Hangzhou (CN); Xinci Wen, Hangzhou (CN); Xurui Feng, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 13/056,001

(22) PCT Filed: Oct. 28, 2010

(86) PCT No.: PCT/US2010/054493
§ 371 (c)(1),
(2), (4) Date: Jan. 26, 2011

(87) PCT Pub. No.: WO2011/078911
PCT Pub. Date: Jun. 30, 2011

(65) Prior Publication Data
US 2012/0275705 A1 Nov. 1, 2012

(30) Foreign Application Priority Data

Dec. 24, 2009 (CN) .......................... 2009 1 0260175

(51) Int. Cl.
*G06K 9/62* (2006.01)
*G06K 9/54* (2006.01)
(52) U.S. Cl.
USPC ............ 382/195; 382/225; 382/305; 707/758
(58) Field of Classification Search
USPC ........... 707/758, 915, 999.107; 382/158, 159, 382/195, 218, 219, 224, 225, 305, 124, 125, 382/115, 100, 217, 215
See application file for complete search history.

(56) References Cited

U.S. PATENT DOCUMENTS 5,270,772 A * 12/1993 Akiyama ...................... 399/110
5,740,269 A   4/1998 Oh et al.
(Continued)

FOREIGN PATENT DOCUMENTS

CN    101211355 A    7/2008

OTHER PUBLICATIONS

Chinese Office Action mailed Jul. 6, 2012 for Chinese patent application No. 200910260175.5, a counterpart foreign application of U.S. Appl. No. 13/056,001, 15 pages.

*Primary Examiner* — Sheela Chawan
(74) *Attorney, Agent, or Firm* — Lee & Hayes, PLLC (57) ABSTRACT

The present disclosure discloses a method and apparatus for creating a sample image index table, filtering image, and searching image, to improve accuracy of monitoring images. A method for image filtering comprises: establishing a sample image index table; extracting regional characteristics from an image to be searched; clustering the regional characteristics of the image to be searched into corresponding nodes; obtaining a corresponding sample image identification by indexing the sample image index table using node identifications of the nodes of the image to be searched; determining a number of duplicate nodes between the image to be searched and the sample image; obtaining a degree of similarity of the image to be searched based on a number of the nodes of the image to be searched and a number of the nodes of the sample image; and filtering out the image to be searched when a degree of similarity between the image to be searched and the sample image exceeds a similarity threshold.

9 Claims, 6 Drawing Sheets

(56) References Cited

U.S. PATENT DOCUMENTS

| | | |
|---|---|---|
| 6,072,904 A | 6/2000 | Desai et al. |
| 6,321,232 B1 | 11/2001 | Syeda-Mahmood |
| 6,564,225 B1 | 5/2003 | Brogliatti et al. |
| 6,792,164 B2 | 9/2004 | Syeda-Mahmood |
| 7,076,095 B2 | 7/2006 | Kim et al. |
| 7,343,046 B2 | 3/2008 | Curry et al. |
| 7,734,067 B2 | 6/2010 | Kim et al. |
| 7,761,453 B2 | 7/2010 | Hamza |
| 7,831,599 B2 | 11/2010 | Das et al. |
| 8,144,947 B2 * | 3/2012 | Kletter .................... 382/124 |
| 8,254,697 B2 * | 8/2012 | Isard et al. ............... 382/209 |
| 8,295,604 B2 * | 10/2012 | Sakai et al. .............. 382/195 |
| 2002/0122587 A1 | 9/2002 | Lim et al. |
| 2006/0088207 A1 | 4/2006 | Schneiderman |
| 2007/0214172 A1 | 9/2007 | Nister et al. |
| 2008/0069477 A1 | 3/2008 | Engels et al. |
| 2009/0092299 A1 | 4/2009 | Jerebko et al. |
| 2009/0110303 A1 | 4/2009 | Nishiyama et al. |
| 2010/0303342 A1 | 12/2010 | Berg et al. |

* cited by examiner

METHOD AND SYSTEM FOR SAMPLE IMAGE INDEX CREATION AND IMAGE FILTERING AND SEARCH

CROSS REFERENCE TO RELATED PATENT APPLICATIONS

This application is a national stage application of an international patent application PCT/US10/54493, filed Oct. 28, 2010, which claims priority from Chinese Patent Application No. 200910260175.5 filed on Dec. 24, 2009, entitled "METHOD AND SYSTEM FOR SAMPLE IMAGE INDEX CREATION AND IMAGE FILTERING AND SEARCH," which applications are hereby incorporated in their entirety by reference.

TECHNICAL FIELD

The present disclosure relates to the image recognition technology field, and particularly relates to a method and system for sample image index creation and image filtering and search.

BACKGROUND

Internet enterprises generally have needs for monitoring images. For example, illegal items inevitably appear, such as weapons and drugs, in the online trading at an electronic commerce platform such as Taobao.com. There is a need to ensure that the uploaded images comply with the laws and regulations. The traditional method for item monitoring is to monitor text information such as the item name and textual description of the item. To avoid being detected, violators often use implicit, unclear language or hints to describe the illegal items. This situation brings a lot of troubles to a platform like Taobao.com to monitor the items.

Currently, there is already theory for basic image filtering, the basis of which is the image recognition technology. In practice, however, there are still many problems. For example, certain known software provides aggressive pornographic image monitoring technology based on image recognition. Such software identifies images that may include large portion of naked skins based on segmentation of skin colors. The advantage of such software is that it can aggressively block pornographic images. But as it is based on segmentation of skin color, it is likely to identify non-pornographic images as pornographic images. The error rates are quite high.

The image recognition technology itself is an immature research field. How to effectively and efficiently model different image contents still puzzles researchers. Even for the classification of pornographic images which is a relatively mature research field, there are still no satisfactory practical effects. While in the application fields of online trading, the objects being monitored are not limited to pornographic images, books, drugs, weapons, identification documents, cosmetics, and etc., as images from different fields can all become monitored objects. In addition, as the speed of change of the images that need to be monitored for online trading is very fast, traditional filtering technology based on image recognition is not sufficient for applications in the online trading.

The current filtering technologies based on image recognition, because of the low accuracy rate, cannot satisfy the commercial applications in online trading.

SUMMARY OF THE DISCLOSURE

The present disclosure provides a method and apparatus for creating sample image index table and filtering image to improve an accuracy rate of monitoring images.

According to one aspect, a method for creating a sample image index table comprises: extracting regional characteristics from a sample image; clustering the regional characteristics of the sample image into a plurality of nodes, respective regional characteristics of a respective node having a same degree of similarity, each node corresponding to a respective node identification; and establishing a sample image index table, the sample image index table storing a correlation between a first node identification of a first node of the plurality of nodes, an identification of the sample image, and a number of times that the respective regional characteristics of the first node appear in the sample image, the sample image index table further storing node identifications of the nodes of the sample image and a count of a number of the nodes in the sample image.

In one embodiment, extracting the regional characteristics from the sample image may comprise extracting the regional characteristics from the sample image by using an extraction algorithm with scale invariability. The extraction algorithm may be a characteristic detector based on Linderberg scale invariability theory or David Lowe's scale invariant feature transform (SIFT)-like high dimension descriptor algorithm.

In one embodiment, the regional characteristics may be regional characteristics vectors, and clustering the regional characteristics of the sample image may comprise: calculating respective distances between the regional characteristics vectors of the sample image using a defined clustering algorithm; and classifying a number of the regional characteristics that are within a region of the sample image and having respective distances smaller than a distance threshold into a same node.

According to another aspect, a method for image filtering comprises: establishing a sample image index table, the sample image index table storing a correlation between node identifications of a plurality of nodes, an identification of a sample image having regional characteristics that are clustered into the plurality of nodes, and a number of times that respective regional characteristics of each of the nodes appear in the sample image, the sample image index table further storing node identifications of the nodes of the sample image and a count of a number of the nodes in the sample image; extracting regional characteristics from an image to be searched; clustering the regional characteristics of the image to be searched into corresponding nodes; obtaining a corresponding sample image identification by indexing the sample image index table using node identifications of the nodes of the image to be searched; determining a number of duplicate nodes between the image to be searched and the sample image; obtaining a degree of similarity of the image to be searched based on a number of the nodes of the image to be searched and a number of the nodes of the sample image; and filtering out the image to be searched in an event that a degree of similarity between the image to be searched and the sample image exceeds a similarity threshold.

In one embodiment, obtaining the degree of similarity degree of the image to be searched may comprise: comparing the number of nodes of the images to be searched and the number of nodes of the sample image to provide a smaller number between the two; and obtaining the degree of similarity degree between the image to be searched and the sample image as a ratio of the number of duplicate nodes between the image to be searched and the sample image to the smaller number.

In another embodiment, obtaining a degree of similarity degree of the image to be searched may comprise: comparing the number of nodes of the images to be searched and the number of nodes of the sample image to provide a bigger number between the two; and obtaining the degree of similarity between the image to be searched and the sample image as a ratio of the number of duplicate nodes between the image to be searched and the sample image to the bigger number.

According to another aspect, an apparatus for creating a sample image index table may comprise: a characteristics extraction unit that extracts regional characteristics from a sample image; a clustering unit that clusters the regional characteristics of the sample image into a plurality of nodes each of which having a respective number of regional characteristics having a same degree of similarity, each node corresponding to a respective node identification; and a storage unit that establishes the sample image index table, the sample image index table storing a correlation between a first node identification of a first node of the plurality of nodes, an identification of the sample image, and a number of times that the respective regional characteristics of the first node appear in the sample image, the sample image index table further storing node identifications of the nodes of the sample image and a count of a number of the nodes in the sample image.

In one embodiment, the characteristics extraction unit may extract the regional characteristics from the sample image by using an extraction algorithm with scale invariability. The extraction algorithm may be a characteristic detector based on Linderberg scale invariability theory or David Lowe's scale invariant feature transform (SIFT)-like high dimension descriptor algorithm.

In one embodiment, the regional characteristics may be regional characteristics vectors, and the clustering unit may calculate respective distances between the regional characteristics vectors of the sample image using a defined clustering algorithm and classify a number of the regional characteristics that are within a region of the sample image and having respective distances smaller than a distance threshold into a same node.

According to another aspect, an apparatus for image filtering may comprise: a storage unit that stores a sample image index table, the sample image index table storing a correlation between node identifications of a plurality of nodes, an identification of a sample image having regional characteristics that are clustered into the plurality of nodes, and a number of times that respective regional characteristics of each of the nodes appear in the sample image, the sample image index table further storing node identifications of the nodes of the sample image and a count of a number of the nodes in the sample image; an extraction unit that extracts regional characteristics from an image to be searched; a node determination unit that clusters the regional characteristics of the image to be searched into corresponding nodes; an index unit that obtains a corresponding sample image identification by indexing the sample image index table using node identifications of the nodes of the image to be searched; a calculation unit that calculates a number of duplicate nodes between the image to be searched and the sample image; a similarity degree calculation unit that obtains a degree of similarity of the image to be searched based on a number of the nodes of the image to be searched and a number of the nodes of the sample image; and an output filtering unit that filters out the image to be searched in an event that the degree of similarity between the image to be searched and the sample image exceeds a similarity threshold.

In one embodiment, the similarity degree calculation unit may be further configured to: compare the number of nodes of the images to be searched and the number of nodes of the sample image to provide a smaller number between the two; and obtain the degree of similarity degree between the image to be searched and the sample image as a ratio of the number of duplicate nodes between the image to be searched and the sample image to the smaller number.

In another embodiment, the similarity degree calculation unit may be further configured to: compare the number of nodes of the images to be searched and the number of nodes of the sample image to provide a bigger number between the two; and obtain the degree of similarity between the image to be searched and the sample image as a ratio of the number of duplicate nodes between the image to be searched and the sample image to the bigger number.

According to yet another aspect, a method for image searching may comprise: establishing a sample image index table, the sample image index table storing a correlation between node identifications of a plurality of nodes, an identification of a sample image having regional characteristics that are clustered into the plurality of nodes, and a number of times that respective regional characteristics of each of the nodes appear in the sample image, the sample image index table further storing node identifications of the nodes of the sample image and a count of a number of the nodes in the sample image; extracting regional characteristics from an image to be searched; clustering the regional characteristics of the image to be searched into corresponding nodes; obtaining a corresponding sample image identification by indexing the sample image index table using node identifications of the nodes of the image to be searched; calculating a number of duplicate nodes between the image to be searched and the sample image; obtaining a degree of similarity of the image to be searched based on a number of the nodes of the image to be searched and a number of the nodes of the sample image; and providing the sample image as a search result in an event that the degree of similarity between the image to be searched and the sample image exceeds a similarity threshold.

In one embodiment, obtaining the degree of similarity of the image to be searched may comprise: comparing the number of nodes of the images to be searched and the number of nodes of the sample image to provide a smaller number between the two; and obtaining the degree of similarity degree between the image to be searched and the sample image as a ratio of the number of duplicate nodes between the image to be searched and the sample image to the smaller number.

In another embodiment, obtaining the degree of similarity of the image to be searched may comprise: comparing the number of nodes of the images to be searched and the number of nodes of the sample image to provide a bigger number between the two; and obtaining the degree of similarity between the image to be searched and the sample image as a ratio of the number of duplicate nodes between the image to be searched and the sample image to the bigger number.

The embodiments of the present disclosure can extract regional characteristics from an image to be searched. The nodes corresponding to the regional characteristics of the image to be searched can be obtained by a clustering algorithm. The corresponding sample image identification can be obtained by using a node identification corresponding to each regional characteristic to index the sample image index table. The degree of similarity between the image to be searched and the sample image is calculated. In an event that the degree of similarity between the image to be searched and the sample image is beyond a similarity threshold, the image to be searched is filtered out for further examination. The accuracy rate of the image monitoring is improved.

Similarly, the techniques of the present disclosure can be applicable in the process of image search. Certain regional characteristics from the image to be searched can be extracted from the obtained image to be searched. The nodes corresponding to the regional characteristics of the image to be searched can be obtained by the clustering algorithm. The corresponding sample image identification can be obtained by using a node identification corresponding to each regional characteristic to index the sample image index table. The degree of similarity between the image to be searched and the sample image is calculated. In an event that the degree of similarity between the image to be searched and the sample image is beyond a similarity threshold, the sample image is used as the search result. The accuracy rate of the image search is high.

DETAILED DESCRIPTION

In the embodiments of the present disclosure, a sample image index table needs to be stored to improve the accuracy of image filtering. The sample image index table stores node information of regional characteristics contained in a sample image. When regional characteristics are extracted from an image to be searched, nodes corresponding to regional characteristics of the image to be searched are obtained, and a node identification corresponding to each regional characteristic is used to index the sample image to obtain the sample image identification. The number of duplicate nodes between the image to be searched and each of the corresponding sample images is calculated by statistics. The degree of similarity of the image to be searched is obtained by using the number of nodes of extracted regional characteristics of the image to be searched after clustering and the number of nodes of extracted regional characteristics of the sample image after clustering that is obtained from the index table. If the degree of similarity between the image to be searched and the sample image is higher than a predetermined similarity threshold, then the image to be searched is filtered into an image examination unit.

Figure 1:
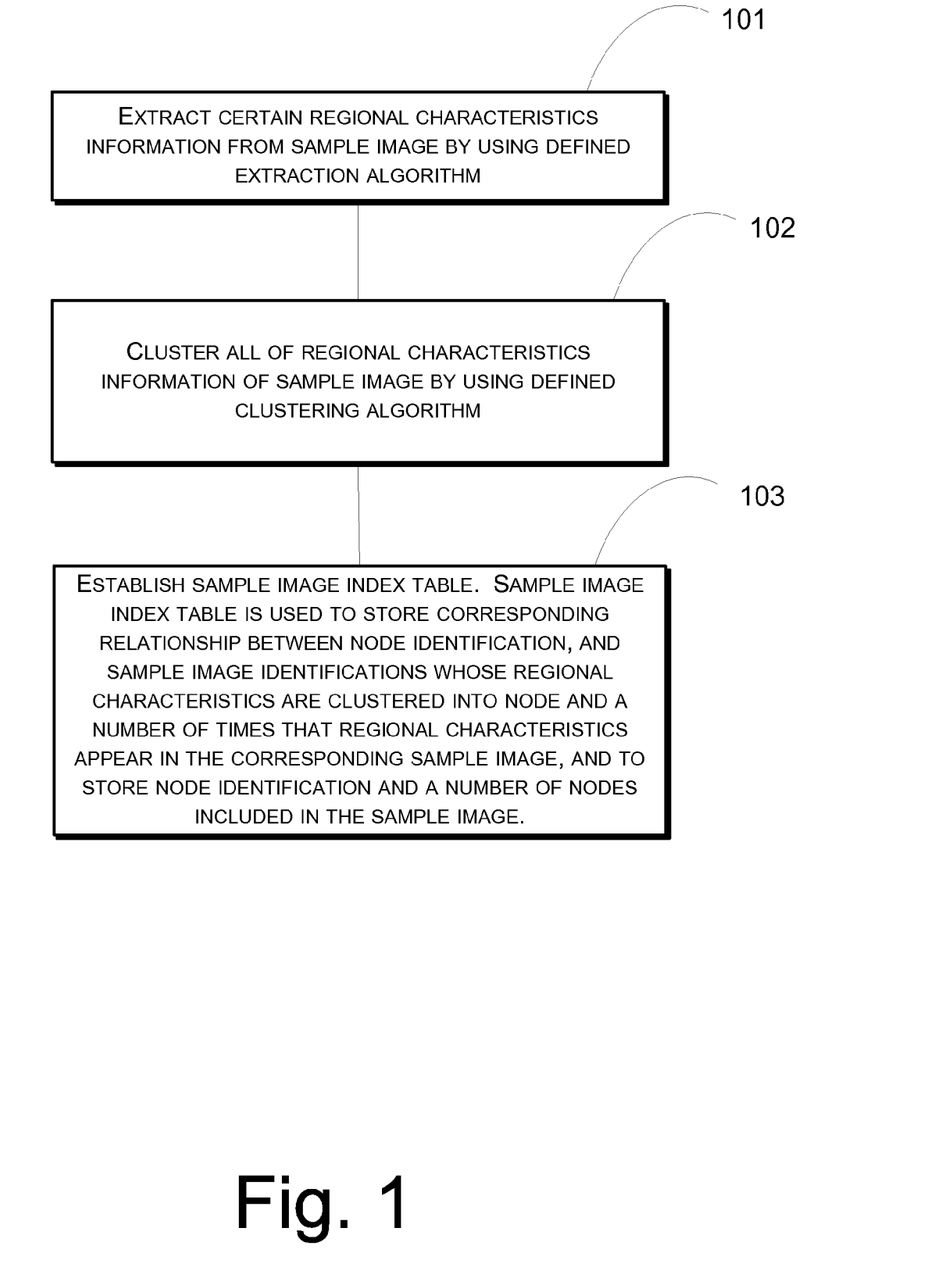
FIG. 1 illustrates a flowchart of an exemplary method for creating a sample image index table in accordance with the present disclosure.

By reference to FIG. 1, a method for creating a sample image index table is described below.

At 101, the method extracts certain information of regional characteristics from a sample image by using a predetermined extraction algorithm.

The sample image is an image that is pre-selected and can be used as a reference for filtering. The regional characteristics can be extracted from multiple sample images. The selection of sample images can also be defined by a user's need. For example, pornographic images can be selected as sample images. Images for books, drugs, weapons, identifications, and cosmetics can also be selected as sample images.

Here the extraction algorithm can be any regional characteristics extraction algorithm with scale invariability, such as characteristic detector based on Linderberg scale invariability theory and David Lowe's scale invariant feature transform (SIFT)-like high dimension descriptor algorithms. These extraction algorithms can automatically obtain scales of the images' structures, and calculate the regional characteristics based on the scales against various variances such as scale variance, light variance, angle variance, and rotation variance. After the regional characteristics are obtained, an image is represented as hundreds of regional characteristics. Information of regional characteristics can be extracted regional characteristics vectors. The present disclosure does not restrict what kind of extraction algorithm is to be used to extract information of regional characteristics from sample images.

At 102, the method clusters all of the information of regional characteristics of the sample image by using a predetermined clustering algorithm.

Regional characteristics with defined degree of similarity are classified into one node. Each node has a corresponding node identification.

In the action 102, multiple regional characteristics can be classified into several groups based on the degrees of similarity. In other words, relatively similar regional characteristics are classified into one group. Each group is referred to as one node. The regional characteristics of each group attribute to the corresponding node.

If the regional characteristics information includes regional characteristics vectors, then at 102 the method can use the predetermined clustering algorithm to calculate the distances between the regional characteristics vectors of each sample image. Those regional characteristics whose distances are smaller than a predetermined distance threshold are classified into the same node.

At 103, the method establishes a sample image index table. The sample image index table is used to store a corresponding relationship between a node identification, sample image identifications whose regional characteristics are clustered into the node, and a number of times that the regional characteristics appear in the corresponding sample image. The sample image index table is also used to store the node identification and the number of nodes included in the sample image.

By reference to FIG. 2, a method for image filtering is described below.

At 201, the method extracts certain regional characteristics from an image to be searched by using a predetermined extraction algorithm.

At 202, the method obtains nodes corresponding to the regional characteristics of the image to be searched by using a predetermined clustering algorithm, and obtains corresponding sample image identification by using a respective node identification corresponding to each regional characteristic to index the sample image index table.

At 203, the method determines a number of duplicate nodes between the image to be searched and a corresponding sample image.

At 204, the method obtains a degree of similarity of the image to be searched by using the number of nodes of the images to be searched after clustering of the extracted regional characteristics and the number of nodes of the corresponding sample image obtained from the sample image index table after clustering of the regional characteristics of the corresponding sample image.

The degree of similarity of the image to be searched can be obtained in a manner described below.

The number of nodes of the image to be searched after clustering of the extracted regional characteristics and the number of nodes of the corresponding sample image obtained from the sample image index table after clustering of the regional characteristics of the corresponding sample image are compared to choose a smaller number. The ratio of the number of duplicate nodes between the image to be searched and the corresponding sample image to the smaller number is used as the degree of similarity between the image to be searched and the sample image. Alternatively, the present disclosure can also use the bigger number between the number of nodes of the image to be searched and the number of nodes of the corresponding sample image obtained from the sample image index table as the calculation number for degree of similarity. The present disclosure does not restrict whether it is the smaller number or the bigger number that is used.

At 205, the method determines whether the degree of similarity between the image to be searched and the sample image is beyond a predetermined similarity threshold. If affirmative, the image to be searched is filtered to the image examination unit; otherwise, the image is deemed as a normal image.

Figure 3:
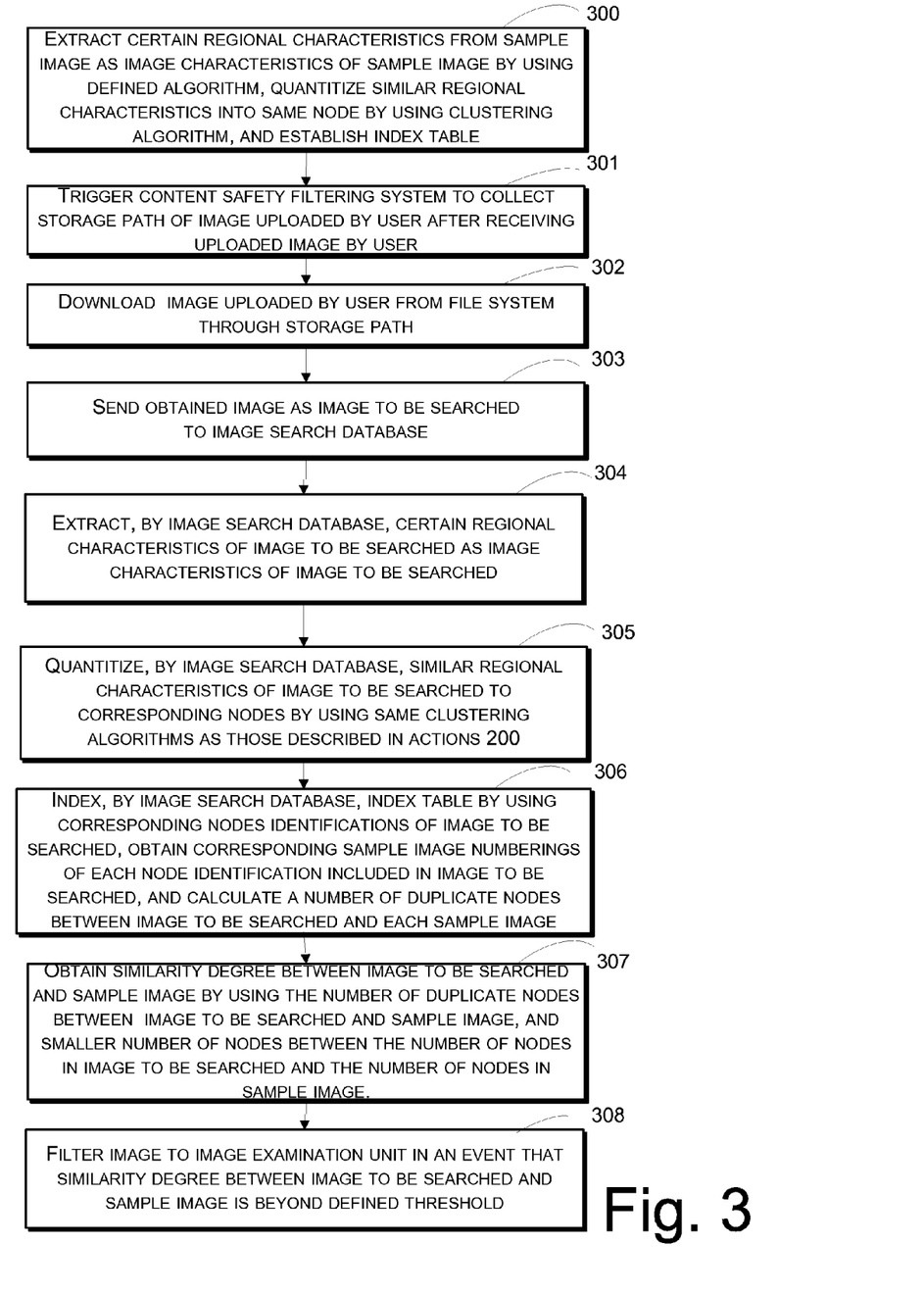
FIG. 3 illustrates a flowchart of an exemplary method for image filtering in accordance with the present disclosure.

By reference to FIG. 3, another method for image filtering is described below.

At 300, the method extracts certain regional characteristics from a sample image as image characteristics of the sample image by using a predetermined algorithm, quantizes similar regional characteristics into a same node by using a clustering algorithm, and establishes an index table. The index table includes a corresponding relationship between a node identification, sample image identifications whose regional characteristics are clustered into the node, and a number of times that the regional characteristics appear in the corresponding sample image. The clustering method can be used to reduce the calculation volume of high dimensional regional characteristics.

For example, in Table 1 below, the node whose node identification is "1" attributes to the sample images whose image identifications are "#Img3307" and "#Img4615." In this example, the node "1" appears 2 times in the sample image "#Img3307" and 3 times in the sample image "#Img 4615." Similarly, in this example the node whose node identification is "N" attributes to the sample images whose image identifications are "#Img2948" and "#Img3693." The node "N" appears 3 times in the sample image "#Img2948" and 5 times in the sample image "#Img3693." The numbering of sample images is equivalent to sample image identifications.

TABLE 1

| Node Identification | Reverse Table (Sample Image Numbering, Number of Times of Appearance) |
|---|---|
| 1 | (#Img3307, 2), (#Img4615, 3) |
| ... | ... |
| N | (#Img2948, 3), (#Img3693, 5) |

At 301, the method triggers a content safety filtering system to collect a storage path of an image uploaded by a user after receiving the uploaded image from the user.

At 302, the method obtains the image uploaded by the user from a file system through the storage path.

At 303, the method sends the obtained image as an image to be searched to an image search database.

Figure 2:
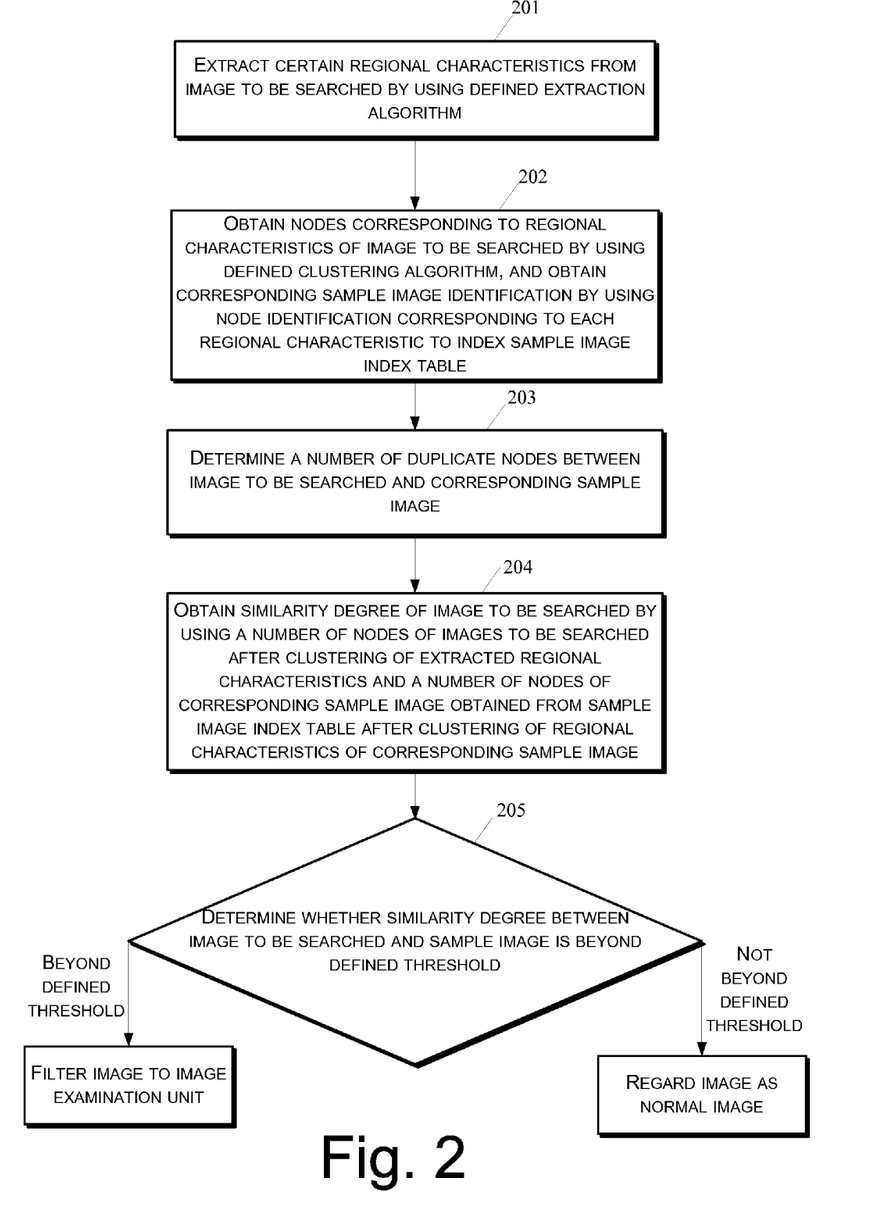
FIG. 2 illustrates a flowchart of an exemplary method for image filtering in accordance with the present disclosure.

At 304, the image search database extracts certain regional characteristics of the image to be searched as image characteristics of the image to be searched by using the same algorithms as those described with respect to FIG. 2.

At 305, the image search database quantizes similar regional characteristics of the image to be searched to corresponding nodes by using the same clustering algorithms as those described with respect to FIG. 2.

At 306, the image search database indexes the index table by using node identifications corresponding to the image to be searched, obtains corresponding sample image numberings of each node identification included in the image to be searched, and calculates a number of duplicate nodes between the image to be searched and each sample image.

At 307, the method obtains a degree of similarity between the image to be searched and the sample image by using the number of duplicate nodes between the image to be searched and the sample image, and a smaller number of the nodes between the number of nodes in the image to be searched and the number of nodes in the sample image.

The regional characteristics extracted from all sample images are finally clustered or classified into different nodes. The regional characteristics of the image to be searched, ImgA, are classified into a node set A={a1, a2, . . . , aN}. Similarly, the regional characteristics of the sample image, ImgB, are classified into a node set B={b1, b2, . . . , bM}, where a1, a2, . . . , aN and b1, b2, . . . , bM represent node numberings. The number of duplicate nodes refers to A∩B or an intersection between A and B. The smaller number of nodes is min (N, M).

At 308, the method filters the image to be searched to an image examination unit in an event that degree of similarity between the image to be searched and the sample image is higher than, or beyond, a predetermined similarity threshold.

In an event that the degree of similarity between the image to be searched and the sample image is beyond the similarity threshold, the image to be searched is regarded as a suspicious image. To further determine the risk of the image to be searched, such image is entered into the image examination unit for manual determination.

The sample images in the image examination unit are risky images automatically determined by the system. There may be a few determination errors which need manual examination. In addition, among the risky images determined by the system, some are similar to the sample images but are not identical. Such kind of images can be added into the sample database after examination to further improve the sample image database.

The administration of the sample image database can be manually done. As prohibited images may change from time to time, the present disclosure also provides functions to manually modify the sample image database. After the sample image database is updated, the index table is also modified at real-time and timely reflected in the search result, thereby achieving high efficiency.

Figure 4:
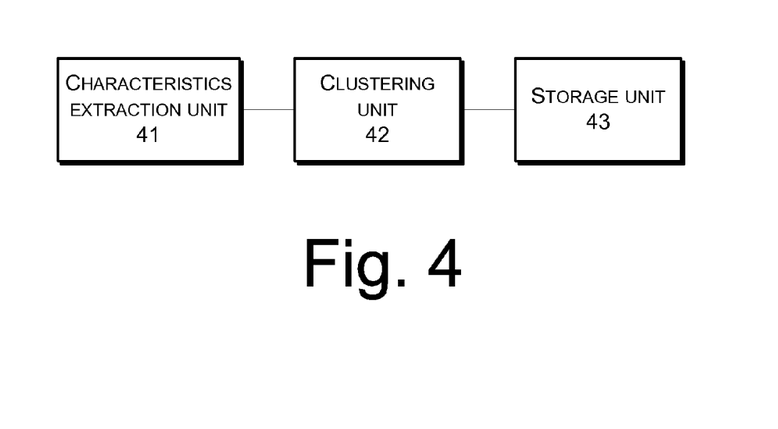
FIG. 4 illustrates a diagram of an apparatus for creating a sample image index table in accordance with the present disclosure.

By reference to FIG. 4, the present disclosure discloses an apparatus for establishing a sample image index table. The apparatus includes a characteristics extraction unit 41, a clustering unit 42, and a storage unit 43.

The characteristics extraction unit 41 is configured to extract certain regional characteristics information from a sample image by using a predetermined extraction algorithm.

The clustering unit 42 is configured to cluster the information of the regional characteristics of the sample image by using a predetermined clustering algorithm. Regional characteristics with defined degree of similarity are classified into one node. Each node has a corresponding node identification.

The storage unit 43 is configured to establish a sample image index table. The sample image index table is used to store a corresponding relationship between a node identification, sample image identifications whose regional characteristics are clustered into the node, and a number of times that the regional characteristics appear in the corresponding sample image. The sample image index table is also used to store the node identification and the number of nodes included in the sample image.

The extraction algorithm can be any regional characteristics extraction algorithm with scale invariability.

The extraction algorithm can be a characteristic detector based on Linderberg scale invariability theory, or SIFT-like high dimension descriptor algorithms.

The regional characteristics information can be extracted regional characteristics vectors. The clustering unit 42 can use the predetermined clustering algorithm to calculate the distances between the regional characteristics vectors of each sample image. Regional characteristics whose distances are smaller than a predetermined distance threshold are classified into a same node.

Figure 5:
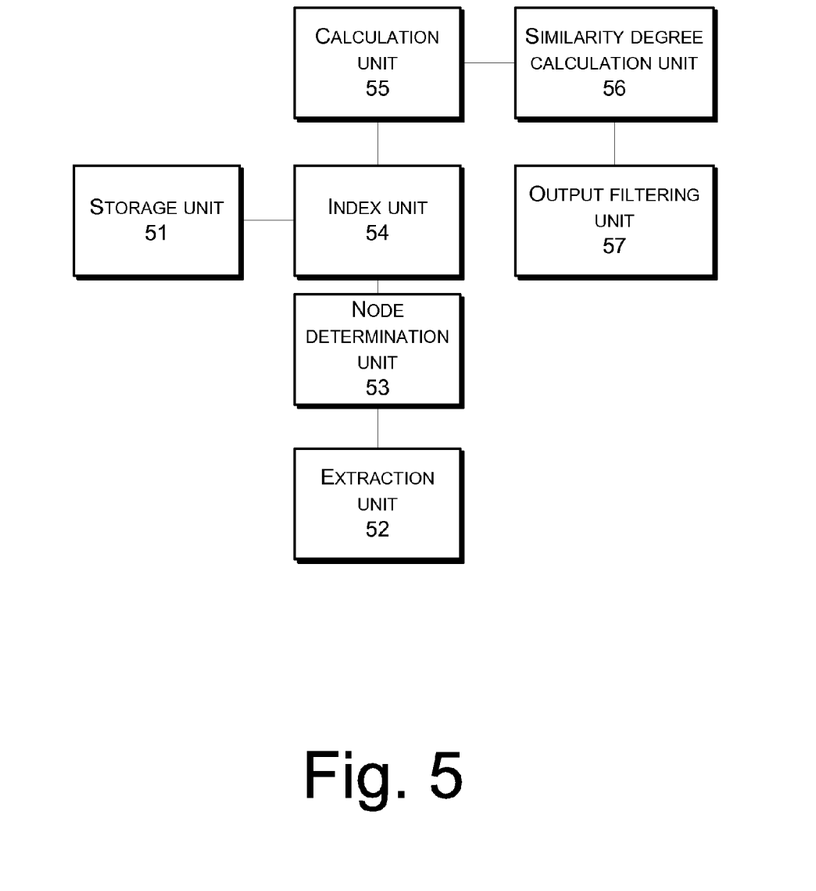
FIG. 5 illustrates a diagram of an apparatus for image filtering in accordance with the present disclosure.

By reference to FIG. 5, the present disclosure discloses an apparatus for image filtering. The apparatus includes a storage unit 51, an extraction unit 52, a node determination unit 53, an index unit 54, a calculation unit 55, a similarity degree calculation unit 56, and an output filtering unit 57.

The storage unit 51 is configured to store a sample image index table. The sample image index table is used to store a corresponding relationship between a node identification, sample image identifications whose regional characteristics are clustered into the node, and a number of times that the regional characteristics appear in the corresponding sample image. The sample image index table is also used to store the node identification and the number of nodes included in the sample image.

The extraction unit 52 is configured to extract certain information of regional characteristics from an image to be searched by using a predetermined extraction algorithm.

The node determination unit 53 is configured to obtain nodes corresponding to the regional characteristics of the image to be searched by using a predetermined clustering algorithm.

The index unit 54 is configured to obtain corresponding sample image identification by using a node identification corresponding to each regional characteristic to index the sample image index table.

The calculation unit 55 is configured to calculate a number of duplicate nodes between the image to be searched and a corresponding sample image.

The similarity degree calculation unit 56 is configured to obtain a degree of similarity of the image to be searched by using the number of nodes of the image to be searched after clustering of the extracted regional characteristics and the number of nodes of the corresponding sample image obtained from the sample image index table after clustering of the regional characteristics of the corresponding sample image.

The output filtering unit 57 is configured to filter the image to be searched in an event that the degree of similarity between the image to be searched and the sample image is higher than, or beyond, a predetermined similarity threshold.

The similarity degree calculation unit 56 is configured to compare the number of nodes of the images to be searched after clustering of the extracted regional characteristics and the number of nodes of the corresponding sample image obtained from the sample image index table after clustering of the regional characteristics of the corresponding sample image. A smaller number of the two may be selected. The ratio of the number of duplicate nodes between the image to be searched and the corresponding sample image to the smaller number is used as the degree of similarity between the image to be searched and the sample image.

The filtering technology of the embodiment of the present disclosure, which is based on image search, compares the uploaded image with one or more sample images that need monitoring. If the uploaded image is very similar with a sample image, the uploaded image will be sent to the examination unit for examination. The advantages of the technology are fast speed and high accuracy. At the meantime, manual examination can further reduce the error rate.

The embodiments of the present disclosure do not intend to recognize content of the image but simply and efficiently compares an uploaded image with one or more sample images, and analyzes the degree of similarity as the extent of risk of the uploaded image. There may be further manual examination for images with high risk possibility. As most of the images relating to online trading are images of commodities and there is high possibility to repeatedly use the images of commodities or repeatedly use the images of commodities after simple variations, the utilization of image search and comparison can monitor most illegal images. Further, the sample image database is manually maintained at real-time. When there is a change in monitoring rules, the modification of the sample image database can modify the monitoring rules. Different monitoring targets can be used for different merchandises to solve the coverage problem. At the meantime, for the characteristics for different commodities, the characteristics of the images can be analyzed and a flexible degree of monitoring can be set up to improve the accuracy.

Similarly, the ideas of image indexing of the present disclosure can also be used in image search field. An image database needs to be established at the search engine server in advance. The images stored in the image database can be images uploaded by users who log in to the website, images imported from other systems, images extracted by network spiders from a large volume of webpages, images from other sources, and images from a combination of one or more above sources, for example. The present disclosure does not limit the source of images. The technologies to extract images by network spider from a large volume of webpages on internet are well-known technologies and are not described in details herein. With respect to the images in the image database, the regional characteristics information is obtained to establish the sample image index table. The sample image index table is used to store a corresponding relationship between a node identification, and sample image identifications whose regional characteristics are clustered into the node and a number of times that the regional characteristics appear in the corresponding sample image, and to store the node identification and the number of nodes included in the sample image. When a client of the search engine sends an instruction for image search, the search engine server analyzes the image to be searched, inquires in the sample image index table, obtains same or similar images with the image to be searched, and returns the result to the client of the search engine.

Figure 6:
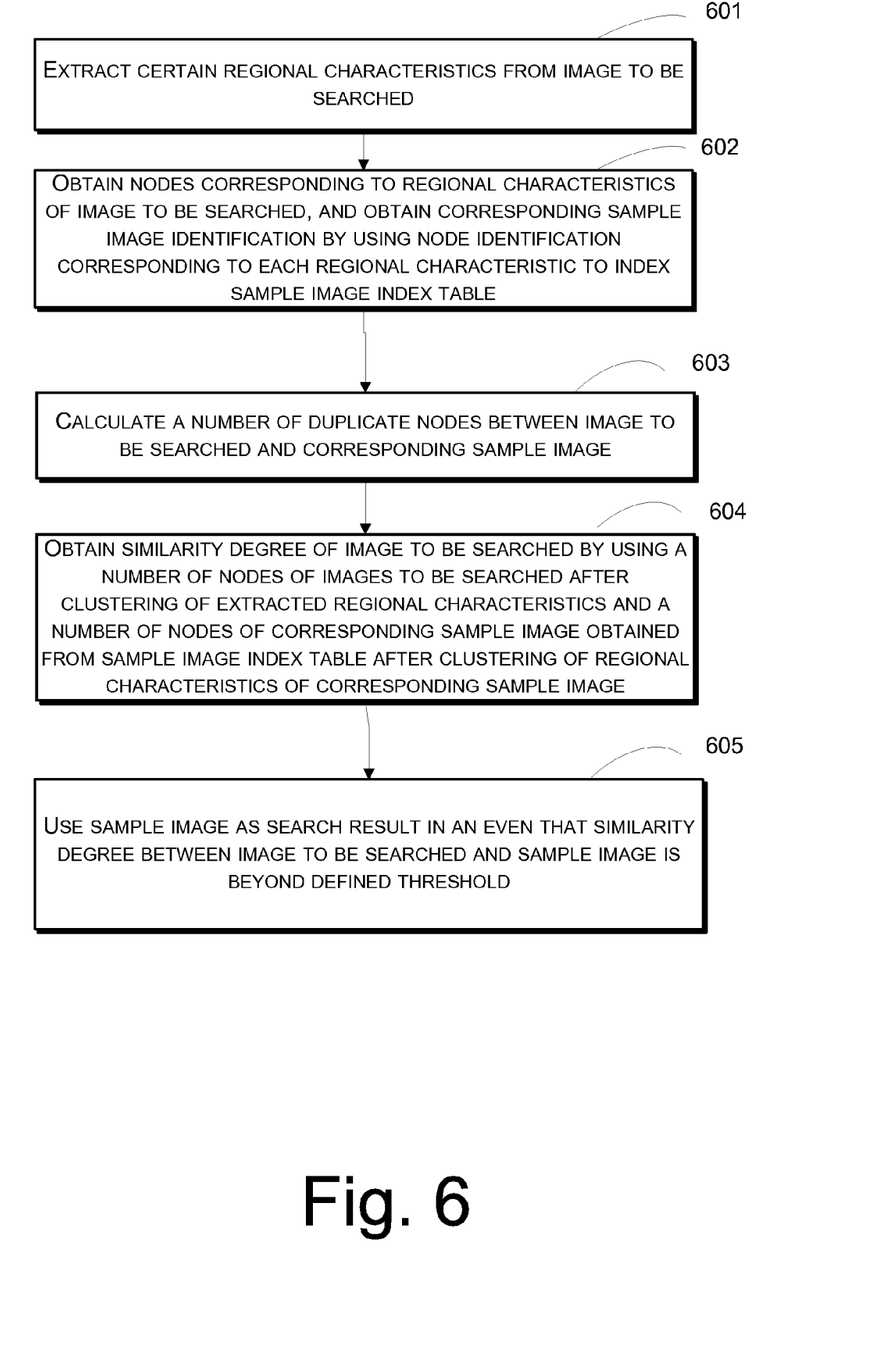
FIG. 6 illustrates a flowchart of an exemplary method for image searching in accordance with the present disclosure.

By reference to FIG. 6, the present disclosure provides a method for image search as described below.

At 601, the method extracts certain regional characteristics from an image to be searched.

At 602, the method obtains nodes corresponding to the regional characteristics of the image to be searched, and obtains corresponding sample image identification by using a node identification corresponding to each regional characteristic to index the sample image index table.

At 603, the method calculates a number of duplicate nodes between the image to be searched and the corresponding sample image.

At 604, the method obtains a degree of similarity of the image to be searched by using the number of nodes of the images to be searched after clustering of the extracted regional characteristics and the number of nodes of the corresponding sample image obtained from the sample image index table after clustering of the regional characteristics of the corresponding sample image.

The degree of similarity of the image to be searched can be obtained in a manner as described below.

The number of nodes of the images to be searched after clustering of the extracted regional characteristics and the number of nodes of the corresponding sample image obtained from the sample image index table after clustering of the regional characteristics of the corresponding sample image are compared to choose a smaller number. The ratio of the number of duplicate nodes between the image to be searched and the corresponding sample image to the smaller number is used as the degree of similarity between the image to be searched and the sample image. Alternatively, the present disclosure can also use the bigger number between the number of nodes of the images to be searched and the number of nodes of the corresponding sample image obtained from the sample image index table as the calculation number for degree of similarity.

At 605, the method uses the sample image as the search result in an even that the degree of similarity between the image to be searched and the sample image is beyond a predetermined similarity threshold.

Figure 7:
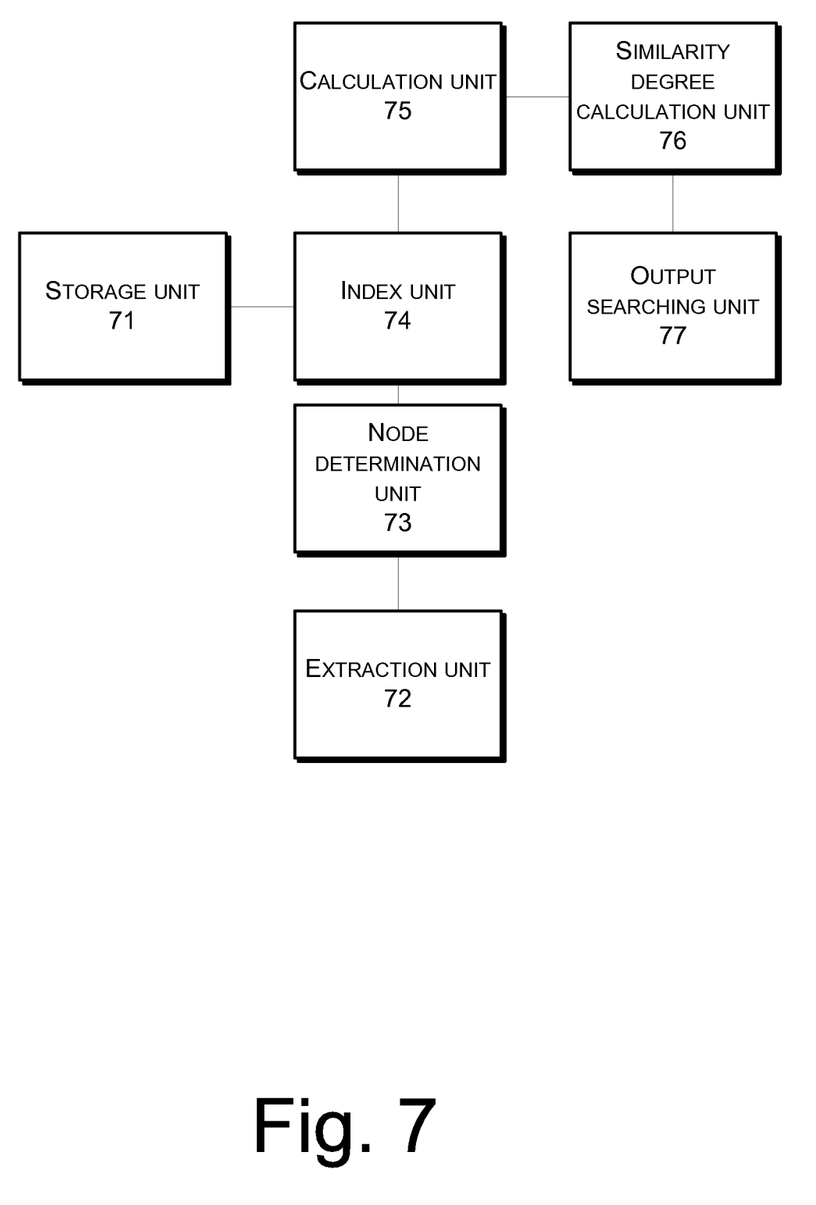
FIG. 7 illustrates a diagram of an apparatus for image searching in accordance with the present disclosure.

By reference to FIG. 7, the present disclosure provides an apparatus for image search. The apparatus includes a storage unit 71, an extraction unit 72, a node determination unit 73, an index unit 74, a calculation unit 75, a similarity degree calculation unit 76, and an output searching unit 77.

The storage unit 71 is configured to store a sample image index table. The sample image index table is used to store a corresponding relationship between a node identification, sample image identifications whose regional characteristics are clustered into the node, and a number of times that the regional characteristics appear in the corresponding sample image. The sample image index table is also used to store the node identification and the number of nodes included in the sample image.

The extraction unit 72 is configured to extract certain information of regional characteristics from an image to be searched.

The node determination unit 73 is configured to obtain nodes corresponding to the regional characteristics of the image to be searched.

The index unit 74 is configured to obtain corresponding sample image identification by using a node identification corresponding to each regional characteristic to index the sample image index table.

The calculation unit 75 is configured to calculate a number of duplicate nodes between the image to be searched and a corresponding sample image.

The similarity degree calculation unit 76 is configured to obtain a degree of similarity of the image to be searched by using the number of nodes of the images to be searched after clustering of the extracted regional characteristics and the number of nodes of the corresponding sample image obtained from the sample image index table after clustering of the regional characteristics of the corresponding sample image.

The output searching unit 77 is configured to output the sample image in an event that the degree of similarity between the image to be searched and the sample image is beyond a predetermined similarity threshold.

The similarity degree calculation unit 76 is configured to compare the number of nodes of the images to be searched after clustering of the extracted regional characteristics and the number of nodes of the corresponding sample image obtained from the sample image index table after clustering of the regional characteristics of the corresponding sample image. A smaller number of the two may be selected. The ratio of the number of duplicate nodes between the image to be searched and the corresponding sample image to the smaller number is used as the degree of similarity between the image to be searched and the sample image.

The similarity degree calculation unit 76 can also be configured to compare the number of nodes of the images to be searched after clustering of the extracted regional characteristics and the number of nodes of the corresponding sample image obtained from the sample image index table after clustering of the regional characteristics of the corresponding sample image. A bigger number of the two may be selected. The ratio of the number of duplicate nodes between the image to be searched and the corresponding sample image to the bigger number is used as the degree of similarity between the image to be searched and the sample image.

The above techniques of the present disclosure can be applicable in the process of image search. If an image to be searched is obtained, certain regional characteristics from the image to be searched can be extracted. The nodes corresponding to the regional characteristics of the image to be searched can be obtained by the clustering algorithm. The corresponding sample image identification can be obtained by using a node identification corresponding to each regional characteristic to index the sample image index table. The degree of similarity between the image to be searched and the sample image is calculated. In an event that the degree of similarity between the image to be searched and the sample image is beyond a predetermined similarity threshold, the sample image is used as the search result. The accuracy rate of the image search is high.

It is appreciated that one of ordinary skill in the art can alter or modify the present disclosure in many different ways without departing from the spirit and the scope of this disclosure. These modifications and variations should therefore be considered to fall within the scope of the claims of the present disclosure and their equivalents.

What is claimed is:

1. A method for creating a sample image index table, the method comprising:
    under control of one or more servers comprising one or more processors;
        extracting regional characteristics from a sample image by using an extraction algorithm with scale invariability;
        clustering the regional characteristics of the sample image into a plurality of nodes, respective regional characteristics of a respective node having a same degree of similarity, each node corresponding to a respective node identification; and
        establishing a sample image index table, the sample image index table storing a correlation between a first node identification of a first node of the plurality of nodes, an identification of the sample image, and a number of times that the respective regional characteristics of the first node appear in the sample image, the sample image index table further storing node identifications of the nodes of the sample image and a count of a number of the nodes in the sample image.

2. The method as recited in claim 1, wherein the extraction algorithm is a characteristic detector based on Linderberg scale invariability theory or David Lowe's scale invariant feature transform (SIFT)-like high dimension descriptor algorithm.

3. The method as recited in claim 1, wherein the regional characteristics are regional characteristics vectors, and wherein clustering the regional characteristics of the sample image comprises:
- calculating respective distances between the regional characteristics vectors of the sample image using a defined clustering algorithm; and
- classifying a number of the regional characteristics that are within a region of the sample image and have respective distances smaller than a distance threshold into a node.

4. A method for image filtering, the method comprising:
- under control of one or more servers comprising one or more processors;
  - establishing a sample image index table, the sample image index table storing a correlation between node identifications of a plurality of nodes, an identification of a sample image having regional characteristics that are clustered into the plurality of nodes, and a number of times that respective regional characteristics of each of the plurality of nodes appear in the sample image, the sample image index table further storing node identifications of the nodes of the sample image and a count of a number of the nodes in the sample image;
  - extracting regional characteristics from an image to be searched;
  - clustering the regional characteristics of the image to be searched into corresponding nodes;
  - obtaining a corresponding sample image identification by indexing the sample image index table using node identifications of the nodes of the image to be searched;
  - determining a number of duplicate nodes between the image to be searched and the sample image;
  - comparing a first number of nodes of the images to be searched and a second number of nodes of the sample image to determine the first number or the second number;
  - obtaining a degree of similarity degree between the image to be searched and the sample image as a ratio of the number of duplicate nodes between the image to be searched and the sample image to the first number if the first number is determined or the second number if the second number is determined; and
  - filtering out the image to be searched in an event that a degree of similarity between the image to be searched and the sample image exceeds a similarity threshold.

5. An apparatus for creating a sample image index table, the apparatus comprising:
- a characteristics extraction unit that extracts regional characteristics from a sample image by using an extraction algorithm with scale invariability;
- a clustering unit that clusters the regional characteristics of the sample image into a plurality of nodes each of which having a respective number of regional characteristics having a same degree of similarity, each node corresponding to a respective node identification; and
- a storage unit that establishes the sample image index table, the sample image index table storing a correlation between a first node identification of a first node of the plurality of nodes, an identification of the sample image, and a number of times that the respective regional characteristics of the first node appear in the sample image, the sample image index table further storing node identifications of the nodes of the sample image and a count of a number of the nodes in the sample image.

6. The apparatus as recited in claim 5, wherein the characteristics extraction unit extracts the regional characteristics from the sample image by using an extraction algorithm with scale invariability, and wherein the extraction algorithm is a characteristic detector based on Linderberg scale invariability theory or David Lowe's scale invariant feature transform (SIFT)-like high dimension descriptor algorithm.

7. The apparatus as recited in claim 5, wherein the regional characteristics are regional characteristics vectors, and wherein the clustering unit calculates respective distances between the regional characteristics vectors of the sample image using a defined clustering algorithm and classifies a number of the regional characteristics that are within a region of the sample image and have respective distances smaller than a distance threshold into a node.

8. An apparatus for image filtering, the apparatus comprising:
- a storage unit that stores a sample image index table, the sample image index table storing a correlation between node identifications of a plurality of nodes, an identification of a sample image having regional characteristics that are clustered into the plurality of nodes, and a number of times that respective regional characteristics of each of the nodes appear in the sample image, the sample image index table further storing node identifications of the nodes of the sample image and a count of a number of the nodes in the sample image;
- an extraction unit that extracts regional characteristics from an image to be searched;
- a node determination unit that clusters the regional characteristics of the image to be searched into corresponding nodes;
- an index unit that obtains a corresponding sample image identification by indexing the sample image index table using node identifications of the nodes of the image to be searched;
- a calculation unit that calculates a number of duplicate nodes between the image to be searched and the sample image;
- a similarity degree calculation unit that:
  - compares a first number of nodes of the images to be searched and a second number of nodes of the sample image to determine the first number or the second number, and
  - obtains the degree of similarity degree between the image to be searched and the sample image as a ratio of the number of duplicate nodes between the image to be searched and the sample image to the first number if the first number is determined or the second number if the second number is determined; and
- an output filtering unit that filters out the image to be searched in an event that the degree of similarity between the image to be searched and the sample image exceeds a similarity threshold.

9. A method for image searching, the method comprising:
- under control of one or more servers comprising one or more processors;

establishing a sample image index table, the sample image index table storing a correlation between node identifications of a plurality of nodes, an identification of a sample image having regional characteristics that are clustered into the plurality of nodes, and a number of times that respective regional characteristics of each of the nodes appear in the sample image, the sample image index table further storing node identifications of the nodes of the sample image and a count of a number of the nodes in the sample image;

extracting regional characteristics from an image to be searched;

clustering the regional characteristics of the image to be searched into corresponding nodes;

obtaining a corresponding sample image identification by indexing the sample image index table using node identifications of the nodes of the image to be searched;

calculating a number of duplicate nodes between the image to be searched and the sample image;

comparing a first number of nodes of the images to be searched and a second number of nodes of the sample image to determine the first number or the second number;

obtaining a degree of similarity degree between the image to be searched and the sample image as a ratio of the number of duplicate nodes between the image to be searched and the sample image to the first number if the first number is determined or the second number if the second number is determined; and providing the sample image as a search result in an event that the degree of similarity between the image to be searched and the sample image exceeds a similarity threshold.

* * * * *